Patented Mar. 5, 1940

2,192,288

UNITED STATES PATENT OFFICE 2,192,288

PRODUCTION OF ORGANIC ACIDS

William J. Hale, Midland, Mich.

No Drawing. Application October 18, 1934,
Serial No. 748,928. Renewed July 20, 1939

19 Claims. (Cl. 260—530)

The present invention relates to the production of organic acids.

This application is a continuation in part of my prior applications Serial No. 571,281, filed October 26, 1931, now Patent 2,027,377; and Serial No. 574,033, filed November 9, 1931, now Patent 2,027,378.

It is known that a molecule of a simple aldehyde may actually be hydrated to a large extent at relatively low temperatures to give an aldehydrol type of compound (Colles, Chem. Soc. 89, 1249 (1906)).

It is also indicated that many oxidation reactions, in the presence of water but in total absence of air or oxygen, may proceed through the dehydrogenation of a hydrated compound. (Wieland Berichte 45,678 (1912)) disclosed that the hydration of carbon monoxide, in the presence of a dehydrogenative agent, leads first to formic acid and then to carbon dioxide and hydrogen.

Again Goldschmidt, Askenasy & Grimm have reported studies on the effect of dehydrogenation and hydration upon acetaldehyde. Their results show a decided loss in the desired product owing to the tendency of the acetaldehyde to decompose in the presence of dehydrogenative catalysts, (Berichte 67,202 (1934)).

In the prior applications above referred to I have disclosed a method of forming the hydrated aldehyde, i. e. the aldehydrol type of compound, at higher temperatures and the subsequent dehydrogenation of this compound to form the corresponding acid.

It is known that most active dehydrogenative catalysts are capable of functioning generally at temperatures as low as 200° C. In these circumstances therefore an improved type of reaction may be secured if the activity of the hydrative catalyst can be increased to such an extent as to render it effective at such lower temperatures, whereby dehydrogenative action proceeds only in the desired direction and without effecting material decomposition of the desired end products. Usually a temperature of from 300° C. to 400° C. is required for the hydration of most aldehydes, and this even in the presence of good hydrative catalysts such as the oxides of aluminum, thorium, tungsten and the like.

I have now found that the catalytic action involved, particularly the hydrative action, may be greatly accelerated by subjecting all or a portion of the catalytic mass to the action of actinic rays, such for example as strong daylight or, preferably, an ultra-violet lamp or similar ray generator. Such actinic rays appear to possess a remarkable effect in increasing the effectiveness of the hydrative catalyst employed in the production of an aldehydrol type of compound from an aldehyde. Furthermore, the employment of such rays permits the use of lower temperatures in the reaction. Although a complete break up of the aldehydrol type of compound may tend to proceed as rapidly as the hydration, such decomposition does not obtain when there is present in the reaction zone a sufficient amount of an active dehydrogenative catalyst which functions immediately to transform the hydrated compound (the aldehydrol) into a more stable form.

Thus the essential conditions of the present process are the utilization of a dehydrogenative catalyst and a hydrative catalyst, the activation of the hydrative catalyst to such an extent that the rate of hydration of the aldehyde is materially increased and the dehydrogenative effect of the dehydrogenative catalyst obtains at the same conditions of temperature. These conditions are therefore ideal for the production of the desired end product, namely the corresponding acid.

The mechanism of the present reaction involves a condition affecting the carbon oxygen group, that is to say the carbonyl group. Under the conditions of the present process the carbonyl group is directly attached to an organic radical so that the hydration proceeds by opening up the ties between carbon and oxygen, thus instituting the presence of two hydroxyl groups in the place of the oxygen. Dehydrogenation proceeds from here outwardly, depending upon what other atoms may be present in the molecule involved.

As described in the copending applications referred to, organic acids may be prepared from such starting materials as the corresponding aldehydes or alcohols, or from compounds like acetylene and ethylene which, by the addition of water, lead to the formation of aldehydes or alcohols, by utilizing a catalytic reaction which involves the dehydrogenation of primary alcohols to form aldehydes, the subsequent hydration of such aldehydes to an aldehydrol compound, and finally the dehydrogenation of the latter compound to the corresponding acid. In the applications referred to the particular types of catalysts required were fully discussed and such catalysts are available for the present process. The catalytic mass comprises essentially a dehydrogenative catalyst, in sufficient amount, and what is termed a directive catalyst, which latter may generally be considered as including partially hydrolyzable salts of an amphoteric base with the desired organic acid or homologue thereof.

Considered generally the invention therefore comprises contacting a vaporous mixture of an aldehyde or alcohol and water with a catalytic mass which includes a dehydrogenative catalyst and a directive catalyst and which catalytic mass is irradiated with actinic rays either prior to or during the reaction.

In carrying out the reaction the dehydrogenative catalyst should be used in a fine state of subdivision and in large excess. Typical examples of dehydrogenative catalysts suitable for employment in the operation are copper, silver, cobalt, zinc, palladium and the platinum metals. Any dehydrogenative catalyst effective below 350° C., and preferably those operative at between 200 and 250° C., may be employed.

Above 350° C., as indicated hereinbefore, a number of dehydrogenative catalysts are known to break down the aldehydic type of compound.

The directive catalytic base utilized in the present process is a compound capable of uniting with the aldehydrol as it is produced. I have found that only organic salts of those bases, which salts undergo appreciable hydrolysis at the temperature of the reaction, fulfill this requirement. The hydroxides of such metals are characterized as amphoteric electrolytes. To a large extent they occupy the lower position on the Lothar-Meyer atomic volume curve of the elements. Such metals include copper, beryllium, magnesium, zinc, aluminum, gallium, lanthanum and the yttrium metals, zirconium, cerium and the cerium metals, chromium, uranium, manganese, iron, cobalt and nickel. The basic organic salts of some of these metals, such for example as iron, cobalt and nickel, should be utilized in low temperature operations for, due to the relatively high concentration of hydrogen encountered, they are reduced at the higher temperatures to the metallic state.

As indicated hereinbefore, certain distinctly hydrative catalysts are valuable in the process. Examples of these are the oxides of aluminum, cerium, thorium, vanadium, tungsten, molybdenum and uranium. The salts of these metals with non-volatile inorganic acids, such as boric and phosphoric acids, are likewise found to contribute to the catalytic activity of the mass. The directive catalysts described above comprehend catalysts of sufficient hydrative properties to function in the process. Furthermore in the preferred operations the inert agillaceous, carbonaceous and/or siliceous supports employed of themselves possess hydrative characteristics.

As described in the copending applications referred to, operations under the present invention are carried out in the presence of water vapor and this, in effect, serves as the controlling agent. The water vapor serves not only as a means for controlling the temperature but also tends to restrict or prevent polymerization of reaction products and the consequent formation of hydrocarbons from the aldehydic compound. An increase in the amount of water vapor tends to prevent the condensation of aldehydes into esters, whereas a diminution of water vapor in the system increases the production of these esters.

It is particularly to be observed that the invention operates with unsaturated hydrocarbons such as ethylene or acetylene. When employing these materials, such for example as acetaylene, it is first hydrated to produce acetaldehyde which, as above described, is then hydrated and dehydrogenated under the action of the catalytic mass to yield acetic acid. Similarly ethylene may first be hydrated to produce ethyl alcohol and this, as described, is subjected to dehydrogenation to form the aldehyde, then hydrated to form the aldehydrol, and subsequently dehydrogenated to yield the acid. Ethylene can be made to yield appreciable quantities of acetic acid if the reaction zone contains a large proportion of tungstic oxide. It is particularly to be observed that the yield from ethylene will be low unless the initial conversion of ethylene to alcohol is substantially complete, because, due to the presence of hydrogen, some of the ethylene present will be converted to ethane. Hence when employing acetylene or ethylene as a starting material, the operation, if desired, may be carried out in two separate stages or zones, in the first of which acetaldehyde or ethyl alcohol is produced, and in the second this produced aldehyde or alcohol, after preliminary clarification, is treated according to the present invention.

In most circumstances the temperatures should not much exceed 300° C., but in the case of the production of higher acids, the temperatures may be raised to approximately 400° C.

It has been found an increase in pressure facilitates the speed of hydration. It is to be understood, however, that the reaction may be carried out at atmospheric, super or sub-atmospheric pressures. By carrying out the reaction at elevated pressures and when utilizing actinic rays, high yields at relatively low temperatures may be secured.

As has been pointed out in the prior applications referred to, the probable mechanism of the present reaction involves the hydration of a simple aldehyde to an aldehydrol type of compound. This type of reaction proceeds best at lower temperatures and the present improvement permits the utilization of considerably lower temperatures than those heretofore found necessary.

As a result of considerable experimentation I am led to believe that the actinic rays employed have a specific action on the hydrative catalyst and that such rays increase the hydrative action of such catalyst in promoting the addition of water to the aldehyde to form the aldehydrol. In addition to this a considerable drop in temperature is effected, that is to say it has been found that when the catalyst described is irradiated with actinic rays the operation may be carried out at a lower temperature, such for example as at approximately 245 to 270° C. Furthermore, I have found that when utilizing actinic rays for the same output of acid as derived from a given amount of aldehyde per unit of time, considerably less catalyst need be employed. In other words, when the catalyst is irradiated with actinic rays, approximately only one-half the amount of catalyst need be employed to obtain the same yield of acid from a given quantity of starting material for the same time of treatment. When highly active rays, such as ultra-violet light, are used, the quantity of catalyst can be cut down to approximately one-fourth of the amount originally required. As noted above, when operations are carried out under pressure, commensurately higher yields are obtained.

If desired, a special reaction chamber may be constructed in which the ultra-violet lamp or other ray generator is located directly within the reaction zone and the catalytic mass is so distributed as to present the optimum surface area of exposure for irradiation.

The present invention also comprehends the acceleration of the reaction by withdrawing all or a portion of the hydrogen, as formed, from the reaction zone. As described in earlier applications, such withdrawal of the hydrogen displaces the equilibrium in favor of the formation of acid. In the preferred operation advantageous results are secured by utilizing an element which will at the one time serve as a septum or membrane permeable to hydrogen and one which itself acts as a ray generator. Materials particularly useful for this purpose are thimbles or membranes of palladium or a silver palladium alloy. Such thimbles may be connected to a tube, to one end of which tube is connected a source of vacuum, such as a vacuum pump. The tube with its connected palladium or silver palladium thimble is fitted within the chamber and the metal or alloy is heated to temperatures sufficiently high to cause it to glow. In these circumstances it is found that the emissions from the palladium or palladium silver thimble act like ultra-violet light in accelerating the reaction; the utilization of these materials, as described, permits the rapid withdrawal of hydrogen from the zone of reaction, thus displacing the equilibrium in favor of acid formation.

It is particularly to be observed, as indicated hereinbefore, that the invention is not limited to the utilization of the activating rays during the reaction. For example, I have found that if the hydrative catalyst is prepared and then activated by steam, and is then, prior to its use in the reaction, irradiated with ultra-violet light, the advantages described are to some extent secured. In other words, by preliminary irradiation of the catalyst, operation may be carried out at a lower temperature and with less quantities of the catalyst.

The advantages secured by operating under the principles of the present invention are illustrated by the following examples:

EXAMPLE IA

A mixture of 25 grams copper acetate, 30 grams manganous acetate, 20 grams chromium acetate, and 200 cc. water was stirred up with 60 grams purified pumice, whereupon the mass was dried at 115° C. The 120 grams of dry catalyst thus obtained carried about 10 grams of copper oxide (⅛ gram mol. wt.); 9 grams of manganous oxide (1/10 gram mol. wt.) and 7 grams chromic oxide (1/10 gram mol. wt.), all in the form of acetates.

Into a glass U-tube of about one inch internal diameter this total weight of catalyst was placed and the tube totally submerged in a fused sodium-potassium nitrate bath. Into this tube, at a temperature of approximately 250° C., was now passed a current of steam until equilibrium was reached, whereby the acetates of the metals were brought into the condition of basic acetates, and acetic acid which was liberated was distilled over. After this conditioning treatment the temperature was raised to the neighborhood of 300° C. and a mixture of acetaldehyde and water was admitted. 80 grams of this mixture containing 1 mol. (44 g) of acetaldehyde to 2 mols. (36 g) of water, was passed through the catalyst at 300° C. in exactly one hour and none of the vapors returned to the system. The results are given below.

EXAMPLE IB

The preceding experiment was now repeated in all detail except for the quantity of catalyst used, which was now reduced to 60 grams, or one-half the amount in the preceding example. The U-tube was now removed from the bath so that about one-third of its length was immersed and two-thirds exposed and submitted to the bright light emanating from a tungsten filament lamp during the one hour period. The conversion of aldehyde to acid was practically the same as in IA, as will be seen from the tabulation of results below.

EXAMPLE IC

The preceding example was now repeated, except that a mercury vapor lamp was employed in lieu of the tungsten lamp, and the temperature was maintained at 270° C. and the weight of the catalyst was reduced to 30 grams. The conversion of aldehyde to acid was again seen to be practically the same as in the preceding example.

EXAMPLE ID

Experiment IC was now repeated with a palladium thimble inserted midway in the tube such that about one-half of the hydrogen produced during the reaction was withdrawn. The temperature during this treatment was maintained at approximately 245° C.

Results

| | 1 mol. aldehyde plus 2 mols. water | Weight catalyst | Time of passage | Conversion aldehyde to acetic acid | Aldehyde recovered | Loss | Temperature |
|---|---|---|---|---|---|---|---|
| | Grams | Grams | Hours | Percent | Percent | Percent | °C. |
| Ex. IA | 80 | 120 | 1 | 25.1 | 74.8 | .1 | 320 |
| Ex. IB | 80 | 60 | 1 | 24.4 | 75.4 | .2 | 300 |
| Ex. IC | 80 | 30 | 1 | 26.8 | 73.2 | 0 | 270 |
| Ex. ID | 80 | 30 | 1 | 45.1 | 54.9 | 0 | 245 |

EXAMPLE IIA

This experiment was conducted in practically the same way as described in Example IA, except that ethyl alcohol was substituted for the acetaldehyde in the proportion of 1 mol. of alcohol to 2 mols. of water. 120 grams of catalyst prepared as in Example I was placed in a U-tube completely submerged in the heating bath and steam at approximately 250° C. was passed through the catalyst as before described. At this juncture the stated amount of alcohol and water was admitted and the operation conducted at 300° C. for one hour. The results are given below.

EXAMPLE IIB

The preceding experiment was then carried out in the same details except that one-half the catalytic mass was employed and the U-tube raised from the heating bath so that about two-thirds of it was exposed and the exposed portion irradiated with a tungsten light. Results are given below.

Example IIC

In this experiment the same details as in IIA were followed but the catalytic mass was now reduced to ¼ its initial weight, that is it now weighed 30 grams and the temperature of the operation was maintained at 270° C. The exposed portion of the tube was irradiated with light from a mercury vapor lamp during the one hour treatment. The results are given below.

Example IID

In this experiment IIC was repeated but a palladium thimble was used to pull out about half of the hydrogen formed during the reaction and the temperature of the operation maintained at 265° C. The results show much higher conversion of acetic acid.

*Results*

| | 1 mol. alcohol plus 2 mols. water | Weight catalyst | Time of passage | Conversion alcohol to acetic acid | Aldehyde recovered | Loss | Temperature |
|---|---|---|---|---|---|---|---|
| | | Grams | Hours | Percent | Percent | Percent | °C. |
| Ex. IIA | 82 | 120 | 1 | 18.6 | 35.1 | 0.2 | 300 |
| Ex. IIB | 82 | 60 | 1 | 19.1 | 36.4 | 0 | 300 |
| Ex. IIC | 82 | 30 | 1 | 19.6 | 38.5 | 0 | 270 |
| Ex. IID | 82 | 30 | 1 | 34.3 | 31.4 | 0 | 265 |

Example IIIA

Example III was carried out to prove applicability of the process to higher alcohols. 1 mol. of N-propyl alcohol was mixed with 2 mols. of water. The diluted propyl alcohol was passed over the same type of catalyst prepared in Example IA, save that here corresponding propionates replaced the acetates in the catalytic mass. 120 grams of pumice impregnated with copper and manganese propionates thus constituted the catalytic mass. The mixture of vapors was passed over the catalyst at a temperature of 310° C., the flow being so regulated that complete passage required one hour. The results are given below.

Example IIIB

Example IIIA was repeated except that the quantity of catalyst was reduced to 60 grams and the U-tube pulled out of the heating bath to ⅔ of its length and submitted to the action of the rays from a tungsten filament light. The results were practically identical with those of Example IIIA, as shown below.

Example IIIC

The quantity of the catalyst was now reduced to 30 grams in weight and an ultra-violet light used to irradiate the exposed portion of the glass tube. The temperature of the treatment was maintained at 295° C. Conversion results, tabulated below, are practically the same as in Examples IIIA and IIIB.

Example IIID

Example IIIC was repeated with the use of a palladium thimble so as to displace the equilibrium in favor of acid formation. The total quantity of mixed alcohol and water vapor was passed through the tube in one hour and heated during such passage to 280° C. The results given below show the higher yield resulting from hydrogen withdrawal.

*Results*

| | 1 mol. N-propyl alcohol plus 2 mols. water | Weight catalyst | Time of passage | Conversion alcohol to acid | Aldehyde remaining | Loss | Temperature |
|---|---|---|---|---|---|---|---|
| | | Grams | Hours | Percent | Percent | Percent | °C. |
| Ex. IIIA | 96 | 120 | 1 | 14.1 | 35.8 | .3 | 310 |
| Ex. IIIB | 96 | 60 | 1 | 15.0 | 37.1 | .2 | 310 |
| Ex. IIIC | 96 | 30 | 1 | 15.5 | 37.5 | 0 | 295 |
| Ex. IIID | 96 | 30 | 1 | 27.5 | 25.1 | 0 | 280 |

As the hydrative action of numerous aldehydes requires somewhat higher temperatures than those of the simpler members of the series, good results by this type of hydration may be obtained up as high as 400° C. but at the higher temperatures almost instantaneous exposure to catalyst will be required. The preferred lower temperature which is employed is that temperature where dehydrogenation can take place readily, namely 200° C. The optimum range however will be found to vary from about 250 to 300° C.

While preferred modifications of the process have been described and while several examples have been given, it will be understood that these are to be taken as illustrative of the principles involved and not as definitive of the limits of the invention, except as such limits are clearly defined in the appended claims.

I claim:

1. A process of preparing organic acids which comprises contacting a primary alcohol and water, in vapor phase, with a catalytic mass which comprises essentially a dehydrogenative catalyst and a hydrative catalyst which hydrative catalyst comprises a partially hydrolyzable salt of an amphoteric base and an organic acid, at temperatures below 350° C., while irradiating the mass with actinic rays.

2. A process of preparing organic acids which comprises contacting an aldehyde and water, in vapor phase and at temperatures below 350° C., with a catalytic mass which comprises essentially a hydrative catalyst which hydrative catalyst comprises a partially hydrolyzable salt of an amphoteric base and an organic acid, and a dehydrogenative catalyst, while irradiating the mass with actinic rays.

3. A process of preparing organic acids which comprises contacting a primary alcohol and water, in vapor phase and below 350° C., with a dehydrogenative catalyst and a hydrative catalyst which hydrative catalyst comprises an oxide of a metal capable of forming a readily hydrolyzable basic organic salt in the presence of said organic acid, the hydrative catalyst being insufficient in amount to normally hydrate all the aldehyde formed as a result of dehydrogenation of the alcohol, but being sufficient in amount to perform such hydration when irradiated by actinic rays; and irradiating the hydrative catalyst with actinic rays during the reaction.

4. A process of preparing organic acids which comprises contacting a primary alcohol and water, in vapor phase and at elevated temperatures, with a catalytic mass which comprises essentially a dehydrogenative catalyst and a hydrative catalyst which hydrative catalyst comprises an oxide of a metal capable of forming a readily hydrolyzable basic organic salt in the presence of said organic acid; and irradiating the catalytic mass with actinic rays.

5. A process of preparing organic acids which comprises contacting an aldehyde and water, in vapor phase and at elevated temperatures, with a catalytic mass which comprises essentially a hydrative catalyst which hydrative catalyst comprises an oxide of a metal capable of forming a readily hydrolyzable basic organic salt in the presence of said organic acid; and a dehydrogenative catalyst, and irradiating the catalytic mass with actinic rays.

6. A process of preparing organic acids which comprises contacting a primary alcohol and water, in vapor phase and at temperatures below 350° C., with a catalytic mass which comprises essentially a dehydrogenative catalyst and a hydrative catalyst which hydrative catalyst comprises a partially hydrolyzable salt of an amphoteric base and an organic acid, and irradiating the catalytic mass with ultra-violet light during the reaction.

7. A process of preparing organic acids which comprises contacting an aldehyde and water, in vapor phase and at temperatures below 350° C., with a catalytic mass which comprises essentially a hydrative catalyst which hydrative catalyst comprises an oxide of a metal capable of forming a readily hydrolyzable basic organic salt in the presence of said organic acid; and a dehydrogenative catalyst, while irradiating the mass with ultra-violet light.

8. A process of preparing organic acids which comprises contacting a primary alcohol and water, in vapor phase and below 350° C., with a dehydrogenative catalyst and a hydrative catalyst, said hydrative catalyst comprising a partially hydrolyzable salt of an amphoteric base and an organic acid, the hydrative catalyst being insufficient in amount to normally hydrate all of the aldehyde formed as a result of dehydrogenation of the alcohol but being sufficient in amount to effect such hydration when irradiated by actinic rays; and irradiating the hydrative catalyst during the reaction.

9. A process of preparing organic acids which comprises contacting a primary alcohol and water, in vapor phase, with a catalytic mass which comprises essentially a dehydrogenative catalyst and a hydrative catalyst which hydrative catalyst comprises an oxide of a metal capable of forming a readily hydrolyzable basic organic salt in the presence of said organic acid; and irradiating the catalytic mass with ultra-violet light.

10. In a process of preparing organic acids which involves the dehydrogenation of alcohol and the hydration of the aldehyde produced and which involves the utilization of a dehydrogenative catalyst and a hydrative catalyst which hydrative catalyst comprises an oxide of a metal capable of forming a readily hydrolyzable basic organic salt in the presence of said organic acid; that improvement which comprises activating the hydrative catalyst with actinic rays.

11. A process of preparing organic acids which comprises contacting a primary alcohol and water, in vapor phase and at temperatures below 350° C., with a catalytic mass which comprises essentially a dehydrogenative catalyst and a hydrative catalyst, said hydrative catalyst comprising a partially hydrolyzable salt of an amphoteric base and an organic acid, irradiating the catalytic mass with actinic rays during the reaction and withdrawing hydrogen as formed from the reaction zone.

12. A process of preparing organic acids which comprises contacting an aldehyde and water, in vapor phase, with a catalytic mass including essentially a hydrative catalyst and a dehydrogenative catalyst said hydrative catalyst comprising a partially hydrolyzable salt of an amphoteric base and an organic acid, irradiating the mass with actinic rays during the reaction, and withdrawing hydrogen as formed from the reaction zone.

13. A process of preparing organic acids which comprises contacting an alcohol and water, in vapor phase, with a dehydrogenative catalyst and a catalytic mass comprising essentially a partially hydrolyzable salt of an amphoteric base and an organic acid, and supported on a hydrative carrier, and irradiating the catalytic mass during the course of the reaction.

14. A method of preparing organic acids which comprises contacting a material chosen from the group including alcohols, aldehydes and compounds which may be hydrated to form alcohols and aldehydes, in the presence of water and at elevated temperature, to the action of a dehydrogenative catalyst and irradiated directive catalytic base, which catalytic base comprises essentially a partially hydrolyzable salt of an amphoteric base and an organic acid which is irradiated with actinic rays.

15. A method of producing organic acids which comprises contacting an aldehyde and water, in vapor phase, with a dehydrogenative catalyst and an irradiated directive catalyst; which directive catalyst comprises essentially an oxide of a metal capable of forming a readily hydrolyzable basic organic salt in the presence of said organic acid, said directive catalyst being irradiated with actinic rays.

16. A method of producing organic acids which comprises contacting an alcohol and water, in vapor phase, with a dehydrogenative catalyst and an irradiated directive catalyst; which directive catalyst comprises essentially an oxide of a metal capable of forming a readily hydrolyzable basic organic salt in the presence of said organic acid said directive catalyst being irradiated with actinic rays.

17. A process of producing organic acids which comprises contacting acetylene and water, in vapor phase, with a dehydrogenative catalyst and an irradiated directive catalyst, which directive catalyst comprises essentially an oxide of a metal capable of forming a readily hydrolyzable basic organic salt in the presence of said organic acid said directive catalyst being irradiated with actinic rays.

18. A process of preparing organic acids which comprises hydrating acetylene to produce acetaldehyde, contacting the acetaldehyde with a dehydrogenative catalyst and an irradiated directive catalyst, which directive catalyst comprises essentially an oxide of a metal capable of forming a readily hydrolyzable basic organic salt of acetic acid said directive catalyst being irradiated with actinic rays.

19. A method of preparing organic acids which comprises contacting ethylene and water, in vapor phase, with a dehydrogenative catalyst and an irradiated directive catalyst, which directive catalyst comprises essentially an oxide of a metal capable of forming a readily hydrolyzable basic organic salt in the presence of said organic acid said directive catalyst being irradiated with actinic rays.

WILLIAM J. HALE.